(12) United States Patent
Parker

(10) Patent No.: US 7,132,170 B2
(45) Date of Patent: *Nov. 7, 2006

(54) POLYMER COATING BLENDS

(75) Inventor: Richard Henry Parker, LaGrange, GA (US)

(73) Assignee: Milliken & Company, Spartanburg, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 10/631,037

(22) Filed: Jul. 29, 2003

(65) Prior Publication Data

US 2005/0025985 A1 Feb. 3, 2005

(51) Int. Cl.
*B32B 9/04* (2006.01)

(52) U.S. Cl. .............. 428/447; 428/500; 428/521; 428/522; 428/474.4; 525/100; 525/104; 525/105; 525/106; 524/861; 524/862

(58) Field of Classification Search ............ 428/447; 525/474, 477, 478, 479, 100, 431
See application file for complete search history.

(56) References Cited

U.S. PATENT DOCUMENTS

| | | | | |
|---|---|---|---|---|
| 4,945,125 | A * | 7/1990 | Dillon et al. | 524/427 |
| 5,648,426 | A * | 7/1997 | Zolotnitsky | 525/100 |
| 6,348,543 | B1 | 2/2002 | Parker | |
| 6,468,929 | B1 | 10/2002 | Parker | |
| 6,545,092 | B1 | 4/2003 | Parker | |
| 2004/0063803 | A1* | 4/2004 | Kim et al. | 522/1 |

* cited by examiner

*Primary Examiner*—Marc S. Zimmer
(74) *Attorney, Agent, or Firm*—Terry T. Moyer; Charlotte C. Wilson

(57) ABSTRACT

An adhesive coating composition for fabric substrates, such as automotive airbags. The coating is formed from a blend including a silicone polymer and a second polymer which is thermodynamically compatible with silicone. In particular, the second polymer has a cohesion parameter ($\delta/MPa^{1/2}$) that is similar to that of silicone so that any thermodynamic barrier to the second polymer dissolving in silicone is removed.

9 Claims, 1 Drawing Sheet

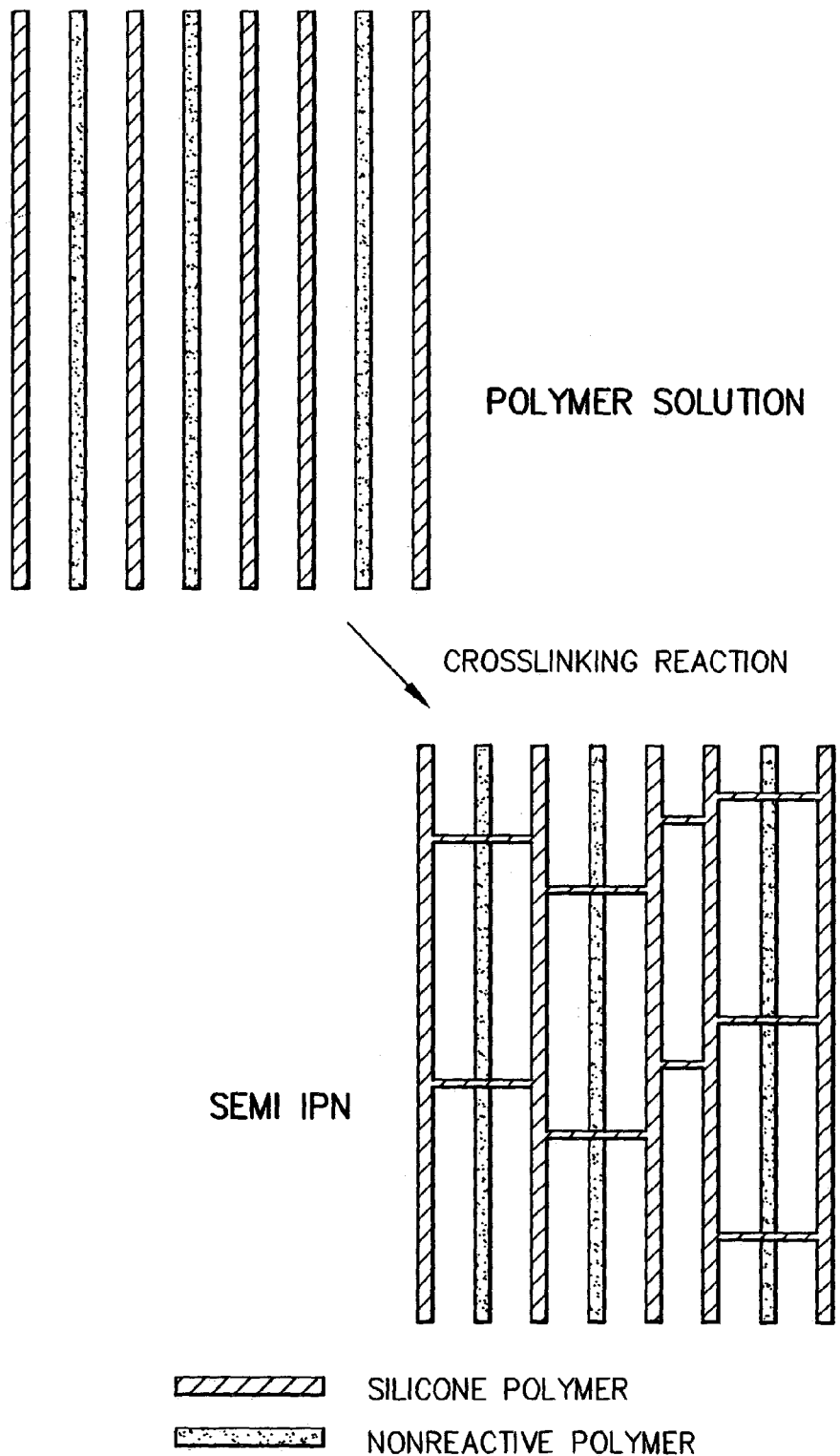
Figure —1—

POLYMER COATING BLENDS

BACKGROUND OF THE INVENTION

The present invention relates generally to adhesive coatings, and, more particularly, to adhesive coatings for airbags utilizing silicone polymer blends.

The use of airbags as safety features in motor vehicles is well known. Airbags are installed on the driver and passenger side of automobiles and, in the event of a collision, are rapidly inflated with gas to act as a barrier between the driver or passenger and the steering wheel or dashboard of the automobile.

There exist three primary types of airbags, each for different end uses. Driver side airbags are generally mounted within steering columns and exhibit relatively low air retention in order to act more as a cushion for the driver upon impact. Passenger-side airbags also comprise relatively high air permeability fabrics that permit release of gas either by percolation of the gas through the fabric or through vents integrated therein. Both of these types of airbags (composed of multiple fabric panels) are designed to protect persons in sudden collisions and generally burst out of packing modules from either a steering column or dashboard. Side curtain airbags, however, have been designed primarily to protect passengers during rollover crashes by retaining the inflation state for a long duration and generally unroll from packing containers stored within the roofline along the side windows of an automobile. Side curtain airbags therefore not only provide cushioning effects but also provide protection from broken glass and other debris. Therefore, it is imperative that side curtain airbags, as noted above, retain large amounts of gas, as well as high gas pressures, to remain inflated throughout the longer time periods of the entire potential rollover situation. Accordingly, depending on the particular end use of the airbag, various features must be included in the structure of the airbag.

Coatings have been applied to fabrics, intended for use in automotive airbags, to resist the unwanted permeation of air through the fabric and, to a lesser extent, to protect the fabric from the hot gases used to inflate the bags. Polychloroprene was the polymer of choice in the early development of this product, but the desire to decrease the folded size of the completed airbag, and the tendency of polychloroprene to degrade, with exposure to heat, and release the components of hydrochloric acid (thereby potentially degrading the fabric component as well as releasing hazardous chemicals), has led to the almost universal acceptance of silicone (polydimethylsiloxane or similar materials) as a more suitable coating. Silicone polymers have excellent thermal properties.

However, silicone polymers have relatively high permeability to gases, when compared to many other elastomers. This feature has not been a matter of concern in coatings used for driver side airbags, as the retention time requirements are very small. However, through the advent of side curtains, which require higher air retention, the retention time has become a greater concern.

Furthermore, the utilization of such silicone polymers has, in the past, come at a price. The costs associated with such silicone compounds are generally quite high, particularly the costs required to provide sufficient coverage of target fabrics while best ensuring low permeability will continue as long as necessary. Furthermore, although lower levels of other types of coatings (thermoplastics and thermosets, such as polyurethanes, for example) have been utilized for such a purpose, there are general add-on amounts that, to date, are required to provide needed long-term inflation gas retention rates for target silicone-coated airbag cushions. As stated above, silicone coating materials are generally preferred over other polymer types due to their ability to withstand varied environmental and storage conditions over long duration.

Yarn shifting has also proven to be a significant problem for airbags. When a sewn seam is put under stress, a naturally lubricating silicone coating may allow the yarns from which the fabric is constructed to shift. This shifting can lead to leakage of the inflating gas through the new pores formed from the shifting yarns, or, in drastic cases, cause the seam to fail. Since the airbag must retain its integrity during a collision event, in order to sufficiently protect the driver or passenger, there is a great need to provide coatings which provide both effective permeability characteristics and sufficient restriction of yarn shifting for the airbag to function properly, if and when necessary. Again, such a coating material is preferably silicone in nature for storage purposes. Therefore, a need exists to provide such beneficial characteristics at lower cost and/or lower add-on levels through an airbag coating that provides low permeability, resistance to yarn shifting and age resistance over long periods of storage.

As another issue, it has recently been found that more efficient side curtain airbag cushions may be produced as one-piece woven (preferably Jacquard woven) articles. Interestingly, the requirements for effective coatings for such one-piece woven airbags are significantly different from those needed for standard driver or passenger side airbags. A one-piece Jacquard (for example) airbag cushion is more economical to produce due to the elimination of the need to first cut fabric portions from coated webs and subsequently sew them together. The distinct disadvantage of this system is that the target bag must be coated on the outside during production, (as opposed to a sewn bag in which the coated face is normally placed within the interior of the air bag). When the Jacquard woven bag is then deployed, inflation pressures may be transmitted through the fabric to the coating, applying a potentially delaminating force to that coating. If the adhesion of the coating to the fabric is strong, then the diffusion forces are localized and, depending upon the strength of the coating film, may lead to a rupture of the film itself, whereupon the inflation gases can easily escape. If the airbag is intended as a side curtain, such inflation gas loss would severely reduce the effectiveness of the inflated airbag and jeopardize its ability to protect during a long duration rollover scenario. On the other hand, if the adhesion of the coating is less strong, then the diffusing force can be dissipated by localized delamination of the film without rupture thereof. This would typically result in a blister (known in the airbag coating industry as an aneurysm) wherein the inflating gases can be retained, but the appearance of the bag, is objectionable, regardless of the fact that the bag itself most likely retains the inflation gases therein. Thus, coatings for such one-piece woven airbags must take into account this dichotomy and balance the adhesion of the coating with the retention of the inflating gases. To date, such a balance of considerations in developing proper airbag coatings, particularly for one-piece woven airbag cushions, has not been exercised.

Thus, it is highly desired to utilize a trustworthy, high inflation gas retention, coating for low permeability airbag cushions, particularly with relatively low costs involved in providing such benefits. Further, the inclusion of a host of other features for airbag coatings may also be desirable depending on the end use of the airbag, including enhanced adhesion of the coating to the bag, greater tear, tensile, and flexural strengths, increased elasticity, biocide and antimicrobial capabilities, and inability to burn.

It has been shown that by forming what are called "interpenetrating polymer networks" (IPNs), the behavior of silicone polymers can be modified. IPNs are a special class of polymer blends in which the polymers exist in networks that are formed when at least one of the polymers is synthesized or cross-lined in the presence of the other. Classical or true IPNs occur when all of polymer species within a blend form chemical crosslinks. More recently, two other types of IPNs have been developed. Apparent IPNs are based on combinations of physically cross-linked polymers. Semi-IPNs have also been formed, which include a combination of cross-linkable and nonreactive linear polymers. In a semi-IPN of polysiloxane (silicone), the silicone component cross-links to itself in the presence of another nonreactive polymer. When this occurs, the nonreactive polymer becomes trapped in the silicone network, and, as a result, imparts additional properties included in the nonreactive polymer to silicone.

Accordingly, the formation of IPNs based on blends of silicone polymers with other polymers having desirable features and characteristics not found in the silicone alone has the potential of greatly enhancing an airbag coating. The extent of formation of these IPNs, however, is limited by the compatibility of the thermodynamic properties of the additional polymers to those of silicone. The most effectively formed IPNs are those in which the constituents are thermodynamically compatible. Whereas previous attempts—as are described in U.S. Pat. Nos. 6,348,543; 6,468,929; and 6,545,092—were successful in forming silicone blends to improve the properties of silicone, such as resistance to seam combing in airbags, these attempts did not address the thermodynamic properties of the silicone polymers compared to those polymers that are blended with silicone to form an IPN. Because it may be desirable to achieve a silicone polymer blend having other properties, such as reduced air permeability and lower cost, there exists a need for identifying a parameter whereby one can predict the likelihood of success in combining polymers having particularly attractive characteristics with silicone polymers to form IPNs.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

According to its major aspects and briefly recited, the present invention is an adhesive coating composition for fabric substrates. The coating is formed from a blend including a silicone polymer and a second polymer, which is thermodynamically compatible with silicone. In particular, the second polymer has a cohesion parameter ($\delta$/MPa$^{1/2}$) that is similar to that of silicone so that any thermodynamic barrier to the second polymer dissolving in silicone is removed.

A feature of the present invention is the use of a silicone polymer in combination with a second polymer that has a similar cohesion parameter to silicone. Because the second polymer has a cohesion parameter compatible with that of silicone, the ability to form effective IPNs wherein the second polymer can impart particular properties to silicone is enhanced. Accordingly, silicone polymer blends can be formed having a variety of improved properties over silicone polymers alone, such as reduced costs, enhanced adhesion of the coating to the bag, low permeability, greater tear, tensile, and flexural strengths, increased elasticity, biocide and antimicrobial capabilities, and inability to burn.

Other features and advantages of the present invention will be apparent to those skilled in the art from a careful reading of the Detailed Description of the Embodiments presented below and accompanied by the drawing.

BRIEF DESCRIPTION OF THE DRAWING

In the drawings,

FIG. 1 is a schematic view of the mechanism for the formation of a semi-IPN between silicone and a nonreactive polymer.

DETAILED DESCRIPTION OF THE EMBODIMENTS

The present invention is an adhesive coating composition, which may be utilized on any fabric substrate. This coating is formed from a "two-part" silicone (polydimethylsiloxane) polymer blended with a curing catalyst and a second polymer, which is thermodynamically compatible with the silicone polymer. As used herein, a "two part" silicone polymer refers to a combination of hydride- and vinyl-functionalized silicones that form chemical crosslinks upon curing with a suitable catalyst. The catalyst may be any standard type, such as "free radical" catalysts which can be composed of peroxides (e.g., cumyl peroxide, acyl peroxide, and benzoyl peroxide); materials, known in the trade as "condensation catalysts", ie. compounds containing titanium, tin and others; and hydrosilylation catalysts, composed of noble metals, such as platinum and the like. Preferred for best results is the platinum-based catalyst. Other well known curing agents may also be used either supplemental to or as a substitute for the preferred platinum type. Additionally, a solvent is preferably present to effectuate proper and thorough mixing of the components of the coating composition of the present invention. More preferably, such solvent is organic and volatile (i.e., evaporates easily at a relatively low temperature); most preferably, such a solvent is toluene or a similar type of volatile liquid.

The second polymer of the present invention may have a cohesion parameter that is similar to the silicone polymer such that any thermodynamic barrier to the second polymer dissolving in silicone is removed. Cohesion parameters indicate the thermodynamic compatibility among various polymers. In particular, if one polymer has a cohesion parameter that is the same as or similar to another polymer, there is a high probability that the two polymers can effectively dissolve in each other. This probability decreases the greater the difference is between the cohesion parameters of the two polymers.

In other applications, the second polymer has a first cohesion parameter and the silicone polymer has a second cohesion parameter wherein the absolute difference between the first and second cohesion parameters is no more than about 3 MPa$^{1/2}$. As reported by the CRC Handbook of Solubility Parameters and Other Cohesion Parameters, 2$^{nd}$ Ed., A.F.M. Barton, CRC Press, silicones have a cohesion parameter of 16 MPa$^{1/2}$. Accordingly, the cohesion parameter of the second polymer should lie between about 13

$MPa^{1/2}$ and about 19 $MPa^{1/2}$. The following is a list of polymers that have cohesion parameters within this preferred range:

| POLYMER | $\delta/MPa^{1/2}$ |
|---|---|
| Polytetrafluoroethylene | 13 |
| Polyethylene | 16 |
| Polybutadiene | 17 |
| Natural Rubber | 17 |
| Ethylene-methyl acrylate (VAMAC ® 2036-1, DuPont) | 18 |
| Ethylene-vinyl acetate (LEVAMELT ® 500, Bayer) | 18 |
| EPDM (NORDEL ® IP 4520, DuPont) | 16 |
| Butyl 400 | 16 |
| Neoprene | 18 |
| Butadiene/styrene, 96/4 | 17 |
| Butadiene/styrene, 87.5/12/5 | 17 |
| Butadiene/styrene, 71.5/28.5 | 17 |
| Butadiene/acrylonitrile 82/18 | 18 |
| Acrylonitrile-butadiene elastomer (HYCAR ® 1052, B.F. Goodrich) | 19 |
| Alcohol soluble resin (PENTALYN ® 255, Hercules) | 18 |
| Alkyd, short oil (coconut oil 34% phthalic anhydride; Plexal C34, Polyplex) | 19 |
| Cellulose acetate (CELLIDORE ® A, Bayer) | 19 |
| Coumarone-indene resin (PICCOUMARONE ® 450-L, Pennsylvania Industrial Chemial) | 19 |
| Isoprene elastomer (CERIFLEX ® IR 305, Shell) | 17 |
| Cellulose nitrate (1/2 sec; H-23, Hagedorn) | 15 |
| Petroleum hydrocarbon resin (PICCOPALE ® 110, Pennsylvania Industrial Chemical) | 18 |
| Polyamide, thermoplastic (VERSAMID ® 930, General Mills) | 17 |
| cis-Polybutadiene elastomer (Bunahuls CB10, Chemische Werke Huels) | 18 |
| Poly(isobutylene)(LUTONAL ® IC/123, BASF) | 15 |
| Poly(ethylmethacrylate)(LUCITE ® 2042 Du Pont) | 18 |
| Poly(methylacrylate)(Rhom and Haas) | 19 |
| Poly(vinyl butyral)(BUTVAV ® B76, Shawnigan) | 19 |
| Poly(vinyl chloride)(VIPLA ® KR, K-50, Montecatini) | 18 |
| Styrene-butadiene (SBR) raw elastomer(POLYSAR ® 5630, Polymer Corp.) | 18 |
| Terpene resin (PICCOLYTE ® S-1000, Pennsylvania Industrial Chemical) | 17 |
| Isobutylene-isoprene rubber | 16 |
| Nitrile-butadiene rubber | 18 |
| Polychloroprene | 18 |
| Vinylidene fluoride-hexafluropropylene copolymer | 15 |
| Polysulfide | 17 |
| Ethylene propylene copolymer | 18 |
| Chloro-sulfonyl polyethylene | 18 |
| Acrylate-acrylic acid | 18 |
| Polyether urethane | 17 |
| Ethylene oxide-epichlorohydrin copolymer | 19 |
| Long oil alkyd resin (PLEXAL ® P65, Polyplex) | 19 |

The cohesion parameters of this list have also been obtained from the CRC Handbook of Solubility Parameters and Other Cohesion Parameters, $2^{nd}$ Ed., and have been rounded to the nearest whole number. Because variations in whole numbers between the polymers, rather than in tenths or hundredths, is more decisive as to whether the polymers will effectively dissolve in each other, the whole numbers are listed.

The use of a silicone polymer in combination with a second polymer that has a similar cohesion parameter to silicone is a particular feature of the present invention. As previously discussed, it has been shown that by forming what are called "interpenetrating polymer networks" (IPNs), the behavior of silicone polymers can be modified. IPNs are a special class of polymer blends in which the polymers exist in networks that are formed when at least one of the polymers is synthesized or crosslinked in the presence of the other. There exist several types of IPNs, including classical or true IPNs, apparent IPNs, and semi-IPNs. Classical or true IPNs occur when all of polymer species within a blend form chemical cross-links. Apparent IPNs are based on combinations of physically cross-linked polymers. Semi-IPNs include a combination of cross-linkable and nonreactive linear polymers. However, the formation of effective IPNs depends on the cohesion parameters of the IPN components.

FIG. 1 illustrates the formation of a semi-IPN. As shown, a semi-IPN of polysiloxane, (silicone) is formed by first dissolving the silicone polymer with a second, nonreactive polymer. A solvent, such as toluene, is preferably present to effectuate proper and thorough, mixing of the components. The dissolving step is significant; because the formation of an effective semi-IPN depends on ability of the silicone polymer and the second polymer to "interdisperse" or distribute evenly in each other. Interdispersion can only occur if the silicone polymer and the second polymer can dissolve in the same solvent and in each other. Accordingly, the silicone polymer and the second polymer should have the same or similar cohesion parameters so that the polymers are able to both dissolve in the same solvent and also to dissolve in each other. Once the silicone polymer and the nonreactive polymer are have been effectively interdispersed, the next step involves a crosslinking reaction so that the silicone polymer can crosslink to itself. The crosslinking reaction is induced by a catalyst, such as platinum, in the presence of heat. Preferably, the silicone polymer is a two-part silicone containing both "hydride"—(ie. terminated with a hydridosilane (Si—H) group) and "vinyl" (ie. containing a silicon-vinyl (Si—CH═CH$_2$)group)—functionalized polysiloxanes. Therefore, crosslinking occurs between the hydride and vinyl-functional groups of the silicone polymer. When the crosslinking reaction is complete, the nonreactive polymer becomes trapped in the silicone network, and, as a result, imparts additional properties included in the nonreactive polymer, (not inherent in the silicone) to the resulting network.

Through the formation of these semi-IPNs, silicone polymer blends can be created that have a variety of improved properties over silicone polymers alone, such as reduced costs, enhanced adhesion of the coating to the bag, greater tear, tensile, and flexural strengths, low permeability, increased elasticity, biocide and antimicrobial capabilities, and inability to burn. This list is not exclusive, as there are many properties that would be beneficial to impart to an otherwise silicone-only coating.

The coating of the present invention may also contain certain silane coupling agents to improve the adhesion of silicone containing coatings to fabrics (such as trimethoxysilanes, triethoxysilanes, mixtures thereof, and the like). Of particular interest are small amounts (e.g., from about 0.5–2, preferably about 1 part per hundred parts of the total base polymers (ie. 1 phr)) of γ-isocyanatopropyl-trimethoxysilane, and/or 3-methacryloxypropyltrimethoxysilane, with a mixture of 1 phr of each component preferred. Such an additive has been found to significantly increase adhesion for the inventive coatings on target one-piece woven airbag cushions to prevent the aforementioned unsightly blistering (aneurysms) that may occur in certain cushions upon inflation.

The coating may also contain pigments or colorants, (for identification or aesthetic reasons); inert ingredients (such as calcium carbonate or other materials classified as fillers); flame retardants; and processing aids necessary to process the composition and make it suitable for use as an airbag coating.

In one embodiment, the coating of the present invention is used in combination with any type of fabric substrate. Depending on the end use of the fabric substrate, the particular silicone polymer blend and the particular type of fabric substrate combined can vary. Such fabric substrates can be formed from natural fibers, such as cotton, ramie, abaca, wool and the like; synthetic fibers, such as polyester, polyamide, regenerated cellulose and the like; and inorganic fibers, such as glass, boron derivative fibers and the like. Furthermore, the target fabrics may be woven, knitted, non-woven and the like. Most preferably, the airbag fabric of the present invention is a Jacquard woven one-piece airbag cushion.

If an airbag fabric is desired, any standard low permeability airbag fabric construction may be utilized as the target airbag fabric with the adhesive coating composition of the present invention. Preferably, however, as noted above, the target fabric substrate is a Jacquard woven cushion, formed from yarns of synthetic fibers, such as polyesters and polyamides. Such yarn preferably has a linear density of about 210 denier to about 630 denier. Such yarns are preferably formed from multiple filaments, wherein the filaments have linear densities of about 6 denier per filament or less. Such substrate fabrics are woven using such weaving machines as, rapier machines or fluid jet weaving machines. The fabric substrate with applied coating will hereinafter be referred to as an airbag base fabric.

In another embodiment of the present invention, upon completion of compounding of the adhesive coating, the formulation is preferably scrape coated across the airbag base fabric, the solvent (toluene, for example) is subsequently removed by evaporation by placing the treated airbag base fabric in an oven at 60–90° C., and the resultant coated airbag base fabric is then cured in an oven at 150–200° to crosslink the remaining silicone polymer constituents and to ultimately form a thin coating. Scrape coating, as used herein, includes, and is not limited to, knife coating, such as knife over roll, knife over gap, knife over table, floating knife and knife over foam pad methods. Because the coating composition exhibits excellent adhesive properties, generally only one coating pass is necessary to provide an effective, stable, low permeability coating on the target fabric substrate.

The final dry weight of the coating may vary with, the intended use. For fabrics in which prolonged retention of the inflating air is not as critical (such as certain non-rollover side curtains, driver's side and passenger airbag cushions), the add-on may be one ounce per square yard. For fabrics in which the extended retention of the inflating air is required, especially in the case of Jacquard woven airbags intended for side curtain use, the add-on (preferred) would be 1.5–3 ounces per square yard, depending on the design of the bag.

As previously indicated, the substrate fabric is preferably a woven polyamide material such as nylon. In the most preferred embodiment, such substrate fabric will be formed from fibers of nylon 6,6. It has been found that such polyamide materials exhibit particularly good adhesion when used in combination with the coating according to the present invention.

EMBODIMENTS OF THE INVENTION

In order to further describe the present invention, the following nonlimiting examples are set forth. The examples are provided for the sole purpose of illustrating the preferred embodiment of the invention and is not to be construed as limiting the scope of the invention in any manner. Coating dispersions were prepared as noted below, using the following constituents, wherein all proportions are by parts:

EXAMPLE 1

Fifteen parts of VAMAC® DP (an ethylene methyl acrylate copolymer from DuPont Polymers; $\delta=18$ MPa$^{1/2}$ (calc)) was dissolved in toluene to make a 25 percent solution. This material was then added to 85 parts of a two-part silicone polymer, Shin-Etsu Chemical Co., Ltd., KE-2001-50 A/B, with 1.0 phr of γ-isocyanatopropyl-trimethoxysilane (available from Shin-Etsu Chemical Co. Ltd.; under the tradename KBE9007) and the resulting mixture was diluted to 50 percent solids with toluene.

Comparatively, the two-part silicone polymer of EXAMPLE 1, above, was utilized without the added ethylene-methyl acrylate copolymer. These materials were then individually coated onto separate 420 denier, nylon 6,6 Jacquard woven one-piece airbag cushions of dimensions 800×250 mm, using a knife coater, dried for two minutes at 150° C., and cured for seven minutes at 170° C. The dry coating weight was 2 ounces per square yard. The characteristic leak-down time from an internal inflation pressure of 20 psi to 10 psi was then measured. The term "characteristic leak-down time" as it pertains to this invention is intended to encompass the measurement of time required for the internal pressure of the target airbag cushion to decrease from an initial pressure of 20 psi to 10 psi. In order to test the characteristic leak-down time for airbags, an adapter, sized to fit the inlet port of an airbag to be tested, is attached to the airbag. A sensor, designed to measure the air pressure inside the bag, is then fed through the adapter to the interior of the bag. Next, the adapter is attached to a compressed air source and the bag is inflated until the sensor detects a pressure of 20 psi. The source of compressed air is then shut off, sealing the system, and a clock is started. The internal pressure is monitored, via the sensor, until enough inflating air diffuses from the system to reach a pressure of 10 psi. The clock is then stopped. The measurements are tabulated and shown in the table below.

EXAMPLE 2

A twenty-five percent solution of fifteen parts of LEVAMELT® 500 (ethylene vinyl acetate copolymer from Bayer Corporation; $\delta=18$ MPa$^{1/2}$ (calc)) in toluene was substituted for the twenty-five percent solution of VAMAC® in the formula described in EXAMPLE 1. This material was coated onto the same airbag fabric and processed and tested in the same manner. The results follow:

| Example | Time for internal pressure to fall from 20 to 10 psi (seconds) for 100% Silicone Polymer | Time for internal pressure to fall from 20 to 10 psi (seconds) for IPN (silicone + second polymer) |
| --- | --- | --- |
| 1 | 5 | 29 |
| 2 | 5 | 60 |

To assure that the results noted above were due to the effect of the IPN and were not restricted to the silicone polymer studied, the process was repeated with another silicone polymer.

EXAMPLE 3

The process described in EXAMPLE 1, was repeated, substituting a two part silicone polymer, RHODORSIL® LSR60HS (produced by Rhodia Silicones) in equal weights for the Shin-Etsu product. Because the Rhodia product is intended to be used as delivered, no γ-isocyanatopropyltrimethoxysilane was added. The material was diluted, coated and the results measured as in EXAMPLE 1. Comparison was made to a coating derived solely from the Rhodia product. The results follow:

| Example | Time for internal pressure to fall from 20 to 10 psi (seconds) for 100% Silicone Polymer | Time for internal pressure to fall from 20 to 10 psi (seconds) for IPN |
|---|---|---|
| 3 | 17 | 81 |

It is well known and well understood within the airbag art, particularly concerning side curtain (low permeability) airbag cushions, that retention of inflation gas for long periods of time is of utmost importance during a collision. Side curtain airbags are designed to inflate as quickly as driver- and passenger-side bags, but they must deflate very slowly to protect the occupants during roll over and side impact. Thus, it is imperative that the bag exhibits a very low leakage rate after the bag experiences peak pressure during the instantaneous, quick inflation. Preferably, a target side curtain airbag cushion should retain such a high internal pressure for a minimum of 25 seconds to provide the maximum protection in the event of a rollover collision. Accordingly, the IPN coatings described in Examples 1, 2 and 3 are improvements over the silicone coatings for side-curtain airbags, based on their reported characteristic leak down times.

To indicate another use for this invention, the following nonlimiting example is submitted:

EXAMPLE 4

Twenty parts of NORDEL® 4520 (an EPDM polymer from DuPont Dow Elastomers; δ=16 MPa$^{1/2}$ (calc)) was dissolved in toluene to make a 25 percent solution. This material was then added to 80 parts of a two-part silicone polymer, Shin-Etsu Chemical Co., Ltd., KE-2001-50 A/B, with 1.5 phr of γ-isocyanatopropyl-trimethoxysilane (available from Shin-Etsu Chemical Co. Ltd., under the tradename KBE9007), 1.5 parts of methacryloxypropyltrimethoxysilane, 1 part tetraoctyl titanate (condensation catalyst), and 0.25 parts commercial yellow pigment dispersion. The resulting mixture was diluted to a 42 percent solids with toluene.

Comparatively, the two-part silicone polymer from EXAMPLE 4, above, was utilized without the added EPDM polymer. These materials were then individually coated onto separate 420 denier, nylon 6,6 Jacquard woven one-piece airbag cushions of dimensions 10 in.×33 in, using a knife coater, dried for 2 minutes at 150° C. The coating including EPDM was then cured at 170° C. for 10 minutes, whereas the 100% silicone coating was cured at 160° C. for 10 minutes. The dry coating weight was approximately 2 ounces per square yard for each cushion. The characteristic leak-down time from an internal inflation pressure of the cushions was then measured in accordance with the procedure delineated above. The measurements are tabulated below:

| Example | Time for internal pressure to fall from 20 to 10 psi (seconds) for 100% Silicone Polymer | Time for internal pressure to fall from 20 to 10 psi (seconds) for EPDM IPN |
|---|---|---|
| 4 | 15 | 15 |

The EPDM IPN coating described in Example 4 may not be a candidate for use with side curtain airbags considering its characteristic leak down time, it is a candidate for a coating front side airbags. As mentioned previously, front side airbags usually do not require a high retention time for internal pressure. Advantageously, the use of EPDM IPN coating instead of 100% silicone polymer coating significantly reduces the costs of the coating, because the price of silicone polymers is approximately 4 times that of EPDM. This reduction in cost, however, would not compromise the effectiveness and quality of the resulting airbag coating as evidenced by the similarities in air retention times between the EPDM IPN and the 100% silicone polymer.

Accordingly, these examples demonstrate the versatility, as well as usefulness, associated with the formation of silicone IPNs based on constituents having similar cohesion parameters.

Finally, there are many alternative embodiments and modifications of the present invention that are intended to be included within the spirit and scope of the following claims.

What is claimed is:

1. An airbag comprising:
   a fabric substrate coated with a coating composition comprising
   (a) a silicone polymer, wherein said silicone polymer is crosslinked by at least one catalyst, and
   (b) a second polymer that is interdispersed within said silicone polymer, creating a plurality of semi-interpenetrating polymer networks in which said second polymer is trapped within said crosslinked silicone polymers,
   wherein said second polymer is selected from the group consisting of polyethylene, polybutadiene, natural rubber, ethylene-vinyl acetate, EPDM, butyl rubber, styrene-butadiene copolymer, acrylonitrile-butadiene elastomer, isoprene elastomer, poly(isobutylene), poly(ethylmethacrylate), isobutylene-isoprene rubber, polychloroprene, ethylene propylene copolymer, chlorosulfonated polyethylene, and urethanes.

2. The airbag as recited in claim 1, wherein said catalyst is selected from the group consisting of platinum, palladium, cumyl peroxide, acyl peroxide, and benzoyl peroxide.

3. The airbag as recited in claim 1, wherein said fabric substrate is woven.

4. The airbag as recited in claim 1, wherein said fabric substrate is knitted.

5. The airbag as recited in claim 1 wherein said fabric substrate is non-woven.

6. The airbag as recited in claim 1 wherein said fabric substrate is formed from the group consisting of natural fibers, synthetic fibers, and inorganic fibers.

7. The airbag as recited as claim 1, wherein said second polymer is ethylene vinyl acetate.

8. The airbag as recited as claim 1, wherein said second polymer is EPDM.

9. An airbag comprising:
   a fabric substrate coated with a coating composition comprising
   (a) a silicone polymer having a first cohesion parameter, wherein said silicone polymer is crosslinked by at least one catalyst, and
   (b) a second polymer that is interdispersed within said silicone polymer, creating a plurality of semi-interpenetrating polymer networks in which said second polymer is trapped within said crosslinked silicone polymers,
   wherein said second polymer has a second cohesion parameter, said second cohesion parameter being between about $MPa^{1/2}$ and 19 $MPa^{1/2}$, wherein the second polymer is not ethylene-methyl acrylate copolymer.

* * * * *

UNITED STATES PATENT AND TRADEMARK OFFICE
CERTIFICATE OF CORRECTION

PATENT NO. : 7,132,170 B2
APPLICATION NO. : 10/631037
DATED : November 7, 2007
INVENTOR(S) : Richard Henry Parker It is certified that error appears in the above-identified patent and that said Letters Patent is hereby corrected as shown below:

In Column 12, Line 6, after "about" and before "MPa½", add -- 13 --

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,132,170 B2 | Page 1 of 1 |
| APPLICATION NO. | : 10/631037 | |
| DATED | : November 7, 2006 | |
| INVENTOR(S) | : Richard Henry Parker | |

It is certified that error appears in the above-identified patent and that said Letters Patent is hereby corrected as shown below:

In Column 12, Line 6, after "about" and before "MPa½", add -- 13 --

This certificate supersedes the Certificate of Correction issued April 29, 2008.

Signed and Sealed this

Twentieth Day of May, 2008

JON W. DUDAS
*Director of the United States Patent and Trademark Office*